US012255403B2

(12) United States Patent
Chao

(10) Patent No.: US 12,255,403 B2
(45) Date of Patent: Mar. 18, 2025

(54) MINIATURIZED BROADBAND ANTENNA AND WIRELESS COMMUNICATION DEVICE USING THE SAME

(71) Applicants: Fu Tai Hua Industry (Shenzhen) Co., Ltd., Shenzhen (CN); HON HAI PRECISION INDUSTRY CO., LTD., New Tapei (TW)

(72) Inventor: Hsin-Hao Chao, New Taipei (TW)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 154 days.

(21) Appl. No.: 18/091,161

(22) Filed: Dec. 29, 2022

(65) Prior Publication Data

US 2023/0134877 A1 May 4, 2023

(30) Foreign Application Priority Data

Nov. 1, 2022 (CN) ......................... 202211357858.4

(51) Int. Cl.
*H01Q 1/38* (2006.01)
*H01Q 5/335* (2015.01)
*H01Q 5/50* (2015.01)
*H01Q 21/28* (2006.01)

(52) U.S. Cl.
CPC ............. *H01Q 21/28* (2013.01); *H01Q 5/335* (2015.01); *H01Q 5/50* (2015.01)

(58) Field of Classification Search
CPC ............ H01Q 1/38; H01Q 21/28; H01Q 5/33; H01Q 5/335; H01Q 5/37; H01Q 5/378; H01Q 5/50; H01Q 9/40
See application file for complete search history.

(56) References Cited

U.S. PATENT DOCUMENTS

| | | | | |
|---|---|---|---|---|
| 5,903,240 | A | 5/1999 | Kawahata et al. | |
| 6,570,538 | B2 * | 5/2003 | Vaisanen ................ | H01Q 21/28 343/702 |
| 7,589,682 | B1 * | 9/2009 | Wu ...................... | H01Q 1/2258 343/702 |
| 7,733,271 | B2 * | 6/2010 | Moon .................. | H01Q 9/0442 343/834 |
| 9,425,509 | B2 * | 8/2016 | Liou ........................ | H01Q 9/42 |
| 2012/0242555 | A1 | 9/2012 | Hsieh et al. | |

* cited by examiner

*Primary Examiner* — Tho G Phan
(74) *Attorney, Agent, or Firm* — ScienBiziP, P.C.

(57) ABSTRACT

A miniaturized antenna with broadband capabilities includes a dielectric substrate, a first radiation unit, a second radiation unit and a feed portion. The dielectric substrate includes a first surface and a second surface. The first radiation unit is arranged on the first surface, the second radiation unit extends from the second surface to the first surface, the second radiation unit includes a ground portion and a first radiation portion. The feed portion feeds current to the first radiation unit, the first radiation unit excites a first radiation frequency band, and the first radiation portion excites a second radiation frequency band. The disclosure also provides a wireless communication device. The antenna is miniaturized and achieves broadband capabilities.

20 Claims, 4 Drawing Sheets

100

MINIATURIZED BROADBAND ANTENNA AND WIRELESS COMMUNICATION DEVICE USING THE SAME

FIELD

The present disclosure relates to the field of antenna, in particular to an antenna and a wireless communication device using the same.

BACKGROUND

With the popularity of wireless devices, wireless devices are becoming smaller and smaller. Therefore, an antenna must not only fit within small wireless devices, but also have a wide bandwidth to support multiple working bands. Together, these two considerations are problematic.

Therefore, improvement is desired.

SUMMARY OF THE DISCLOSURE

The embodiment of the present disclosure provides an antenna with small size and ability to support multiple working frequency bands and a wireless communication device with the antenna.

The present disclosure provides an antenna, the antenna includes a dielectric substrate, a first radiation unit, a second radiation unit, and a feed portion. The dielectric substrate includes a first surface and a second surface. The first radiation unit is arranged on the first surface. The second radiation unit extends from the second surface to the first surface, wherein the second radiation unit comprises a ground portion and a first radiation portion, a part of the second radiation unit arranged on the first surface is used as the first radiation portion, another part of the second radiation unit arrange on the first surface is used as the ground portion, and the first radiation portion and the first radiation unit are adjacent and spaced. The feed portion is configured to feed current to the first radiation unit, the first radiation unit excites a first radiation frequency band, the current flowing through the first radiation unit is further coupled and fed into the first radiation portion, and the first radiation portion excites a second radiation frequency band.

In some embodiments, the first surface deviates from the second surface, and the first radiation unit comprises a second radiation portion and a third radiation portion, the second radiation portion is connected to the third radiation portion, the second radiation portion is a right-angled trapezoid, and the third radiation portion is rectangular, a length of a bottom edge of the second radiation portion is less than a length of the third radiation portion, a right-angle side edge of the second radiation portion is flush with one end of the third radiation portion, the first radiation portion and the second radiation portion are arranged at relative intervals, and the feed portion is connected to the second radiation portion.

In some embodiments, the first radiation portion is rectangular, and the first radiation portion is parallel to the third radiation portion.

In some embodiments, the ground portion comprises a first ground portion and a second ground portion, and the first ground portion is vertically connected to the second ground portion, the first ground portion is arranged close to the right-angle side edge of the second radiation portion, and the first ground portion is parallel to the right-angle side edge of the second radiation portion; the second ground portion is arranged at one end of the second surface away from the first radiation unit.

In some embodiments, the second ground portion is parallel to the third radiation portion, and the second ground portion is connected to the first radiation portion.

In some embodiments, the first ground portion and the second ground portion are rectangular.

In some embodiments, a dielectric coefficient of the dielectric substrate is 9.8.

In some embodiments, the first radiation frequency band comprises 5.15 GHz to 7.125 GHz, and the second radiation frequency band comprises 2.4 GHz to 2.5 GHz.

In some embodiments, a projected area of the ground portion on the second surface along a thickness direction of the antenna does not overlap a projected area of the first radiation unit on the second surface along the thickness direction of the antenna.

In some embodiments, the dielectric substrate is an alumina and ceramic substrate.

The present disclosure further provides a wireless communication device, which includes the plurality of antennas as described above.

In the present disclosure, the first radiation unit and the second radiation unit are arranged on the dielectric substrate, and the second radiation unit extends from the second surface to the first surface to form the first radiation portion and the ground portion on the second radiation unit; the first radiation unit receives the current fed by the feed portion to excite the first radiation frequency band, and the first radiation portion is coupled to the first radiation unit on the first surface to excite the second radiation frequency band. The antenna provided in the present disclosure is not only miniaturized, but also provides the ground portion of the antenna without more feeding portions requiring to be set. Thus multiple working frequency bands are stimulated, and the antenna provides broadband connections.

DETAILED DESCRIPTION

The technical solutions in the embodiments of the present disclosure will be described in conjunction with the accompanying drawings in the embodiments of the present disclosure. Obviously, the described embodiments are part of the embodiments of the present disclosure, not all of them. Based on the embodiments of the present disclosure, all other embodiments obtained by those of ordinary skill in the art without creative work shall fall within the protection scope of the present disclosure.

It should be noted that when an element is described as “electrically connecting” to another element, it can be directly on another component or there can be a centered element. When an element is said to be “electrically connected” to another element, it can be a contact connection, for example, a wire connection, or a non-contact connection, for example, a wireless coupling.

The terms used in the description of the present disclosure herein are only for the purpose of describing specific embodiments and are not intended to limit the present disclosure. The term "and/or" as used herein includes any and all combinations of one or more related listed items.

With the popularity of wireless devices, the size of wireless devices is becoming smaller and smaller. Therefore, an antenna needs to be used in small wireless devices, but also needs to provide a wide bandwidth to support multiple working bands.

Figure 1:
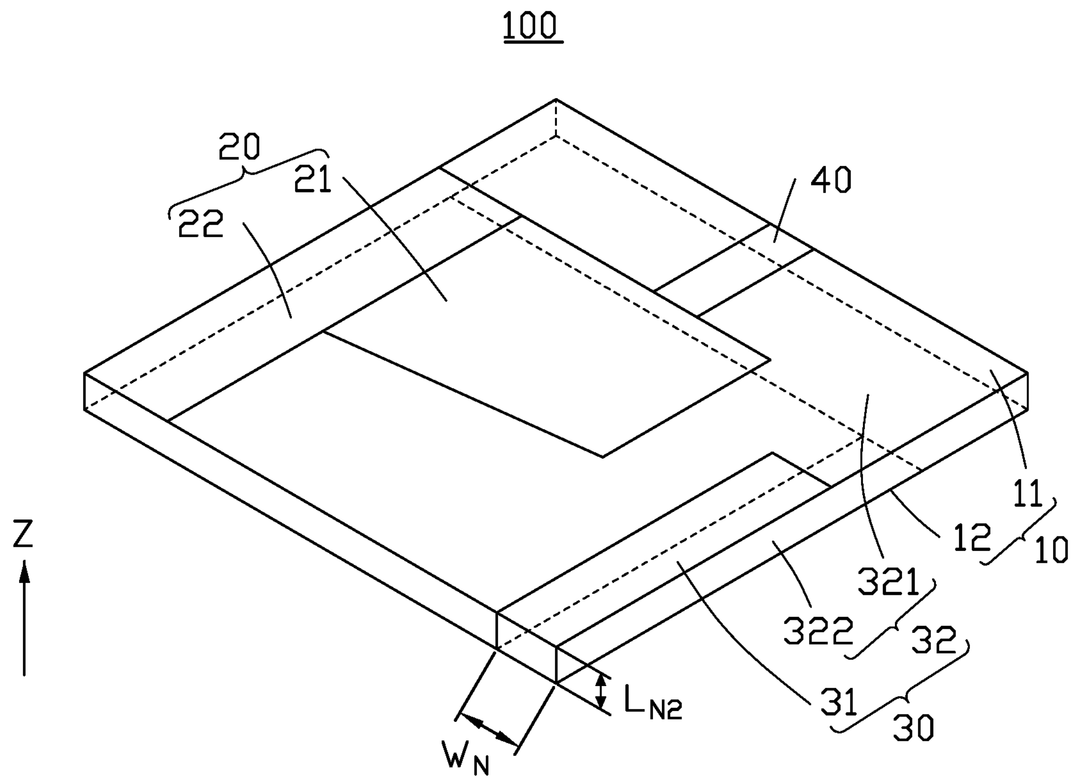
FIG. 1 is a schematic diagram of an antenna according to an embodiment of the present disclosure.

FIG. 1 illustrates an antenna 100 in accordance with an embodiment of the present disclosure.

The antenna 100 can be applied to a customer premises equipment (CPE), a router, a set top box, a mobile phone, a laptop and other wireless communication devices (not shown in the figure) to transmit and receive radio waves to transmit and exchange radio signals.

In some embodiments, the antenna 100 includes a dielectric substrate 10, a first radiation unit 20, a second radiation unit 30, and a feed portion 40.

The dielectric substrate 10 includes a first surface 11 and a second surface 12.

The first radiation unit 20 is arranged on the first surface 11. The second radiation unit 30 extends from the second surface 12 to the first surface 11. The second radiation unit 30 includes a first radiation portion 31 and a ground portion 32. The part of the second radiation unit 30 is arranged on the first surface 11 as the first radiation portion 31. The other parts of the second radiation unit 30 except those arranged on the first surface 11 serves as the ground portion 32. The first radiation portion 31 is adjacent to the first radiation unit 20 at intervals.

The feed portion 40 is used to feed current to the first radiation unit 20, so that the first radiation unit 20 can excite a first radiation frequency band. The current flowing through the first radiation unit 20 is also coupled and fed to the first radiation portion 31 so that the first radiation portion 31 can excite a second radiation frequency band. In some embodiments, the feed portion 40 may be a microstrip line or other metal conductor connected to the feed line.

In the present disclosure, the first radiation unit 20 and the second radiation unit 30 are arranged on the dielectric substrate 10, and the second radiation unit 30 extends from the second surface 12 to the first surface 11 to form the first radiation portion 31 and the ground portion 32 on the second radiation unit 30; the first radiation unit 20 receives the current fed by the feed portion 40 to excite the first radiation frequency band, and the first radiation portion 31 is coupled to the first radiation unit 20 on the first surface 11 to excite the second radiation frequency band. The antenna 100 provided in the present disclosure not only realizes miniaturization, but also provides the ground portion 32 of the antenna 100 without setting more feeding portions, which can stimulate multiple working frequency bands for broadband.

In some embodiments, the first radiation unit 20 includes a second radiation portion 21 and a third radiation portion 22. The second radiation portion 21 is connected to the third radiation portion 22. The second radiation portion 21 is a right-angle trapezoid, and the third radiation portion 22 is rectangular. The right-angle side edge of the second radiation portion 21 is flush with one end of the third radiation portion 22. The feed portion 40 is connected to the second radiation portion 21. In this way, through the above design, the first radiation frequency band is excited by the second radiation portion 21 and the third radiation portion 22 jointly.

The first radiation portion 31 is parallel to the third radiation portion 22. The first radiation portion 31 and the second radiation portion 21 are arranged at relative intervals. Therefore, when the feed portion 40 feeds the current to the second radiation portion 21, the second radiation portion 21 also couples the current to the first radiation portion 31, so that the first radiation portion 31 can excite the second radiation frequency band.

Figure 2:
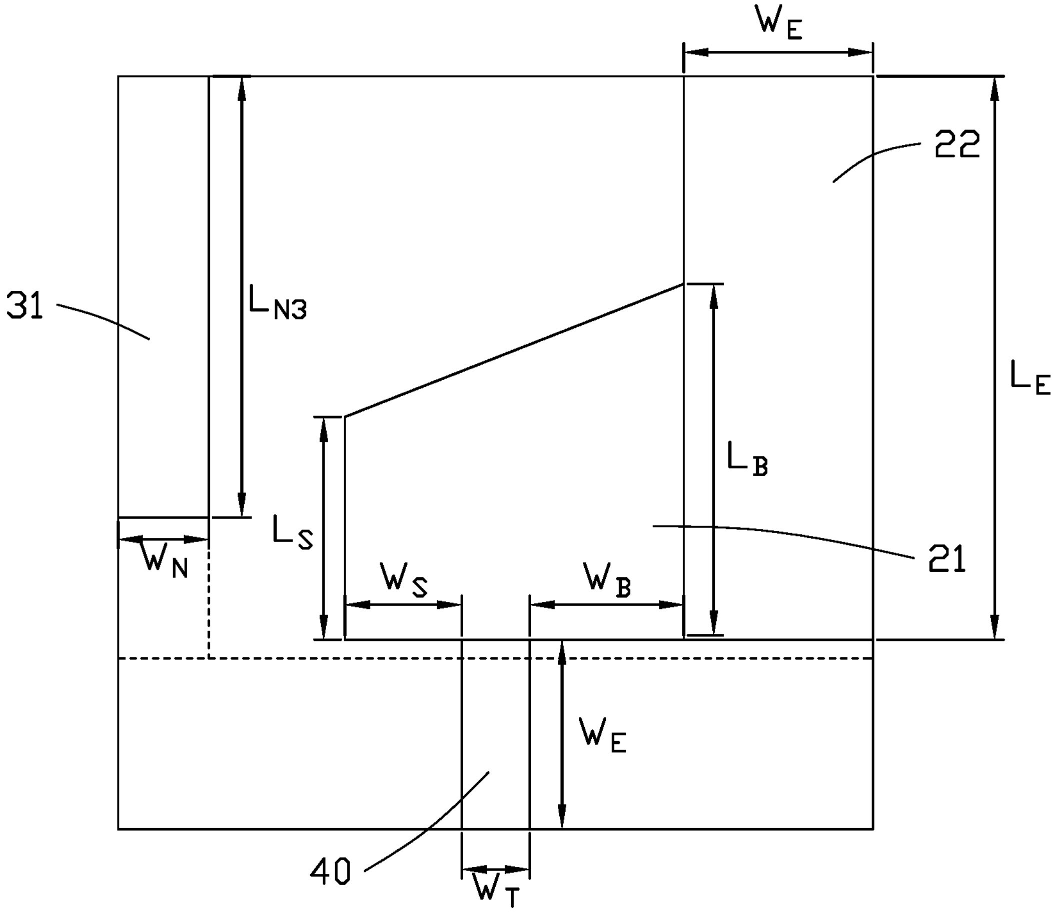
FIG. 2 is a schematic diagram of a first surface of the antenna shown in FIG. 1.

Referring to FIG. 2, the second radiation portion 21 and the third radiation portion 22 are formed from one conductor, for example, a metal sheet. The length $L_B$ of the bottom edge of the second radiation portion 21 is 8.5 mm, which is smaller than the length $L_E$ of the third radiation portion 22, such as 15 mm. The third radiation portion 22 is also arranged along the edge of the first surface 11, and the end of the third radiation portion 22 far away from the right-angle side edge of the second radiation portion 21 is aligned with the edge of the first surface 11 of the dielectric substrate 10.

In the embodiment, the width $W_E$ of the third radiation portion 22 is 3.5 mm. The length $L_S$ of the other bottom edge of the second radiation portion 21 is 6 mm. The length of the right-angle side edge of the second radiation portion 21 is 10.4 mm. The distance $W_S$ from the end of the second radiation portion 21 away from the third radiation portion 22 to the feed portion 40 is 3 mm. The distance $W_B$ from the end of the second radiation portion 21 close to the third radiation portion 22 to the feed portion 40 is 5.6 mm. The width $W_T$ of the feed portion 40 is 1.8 mm. The length $W_E$ of the feed portion 40 is 3.5 mm. The length $L_{N3}$ of the first radiation portion 31 is 12 mm. The width $W_N$ of the first radiation portion 31 is 2.5 mm.

Figure 3:
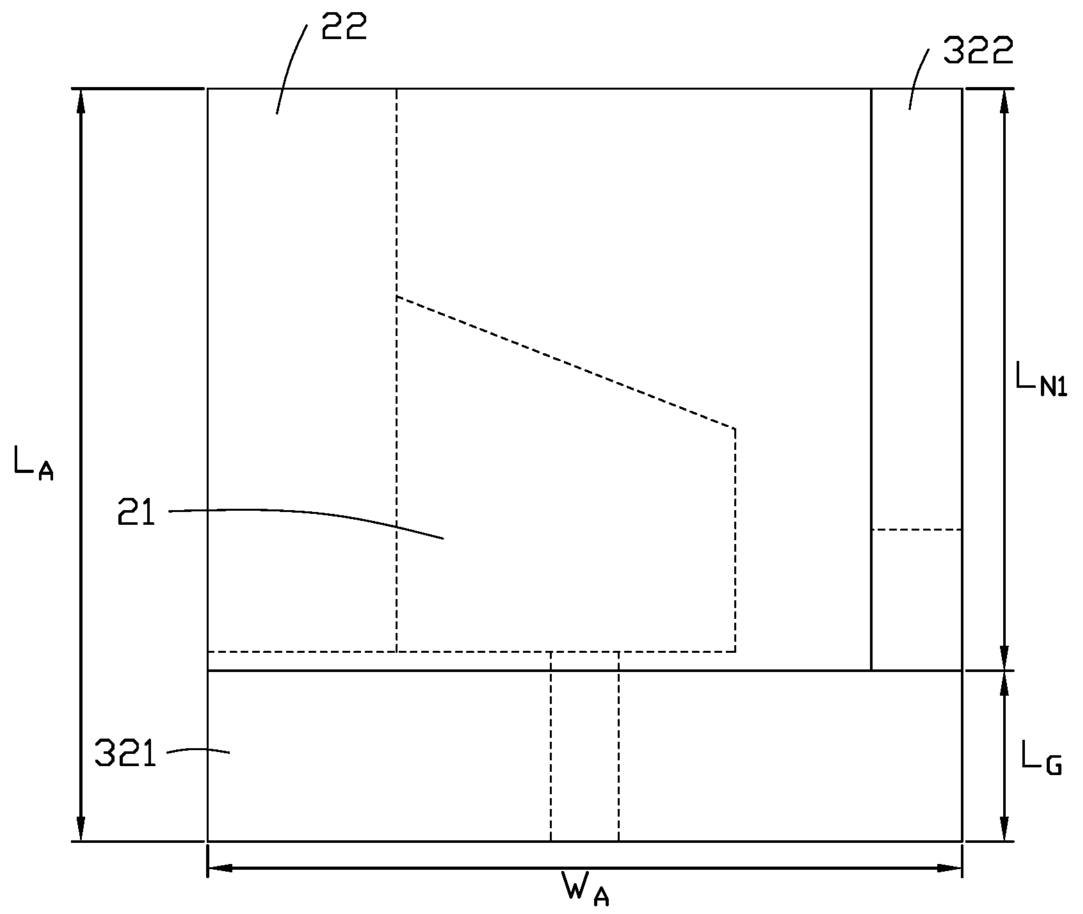
FIG. 3 is a schematic diagram of a second surface of the antenna shown in FIG. 1.

Referring to FIG. 3, in some embodiments, the ground portion 32 includes a first ground portion 321 and a second ground portion 322. The first ground portion 321 is vertically connected to the second ground portion 322. The first ground portion 321 is arranged near the right-angle side edge of the second radiation portion 21, the first ground portion 321 is parallel to the right-angle side edge of the second radiation portion 21. In some embodiments, the first ground portion 321 and the second ground portion 322 may be formed of one conductor.

The second ground portion 322 is arranged on the end of the second surface 12 far away from the first radiation unit 20. The second ground portion 322 is parallel to the third radiation portion 22, and the second ground portion 322 is connected to the first radiation portion 31.

In the embodiment, the first ground portion 321 and the second ground portion 322 are rectangular. The first ground portion 321 is aligned with the second surface 12 close to the right-angle side edge of the second radiation portion 21. The second ground portion 322 is aligned with the second surface 12 close to the edge of the second radiation portion 21, and the second ground portion 322 is vertically connected to the first ground portion 321. The length $W_A$ of the first ground portion 321 is the same as the width of the dielectric substrate 10, both of which are 20 mm. The width $L_G$ of the first ground portion 321 is 5 mm, which is less than the distance from the right-angle side edge of the second radiation portion 21 to the edge of the adjacent second surface 12. The length $L_{N1}$ of the second ground portion 322 is 15 mm. The width $W_N$ of the second ground portion 322 is 2.5 mm (shown in FIG. 1), which is less than the distance from the end of the second radiation portion 21 away from the third radiation portion 22 to the edge of the first surface 11. The projection area of the ground portion 32 on the second surface 12 along the thickness direction of the antenna 100 (the direction of the Z-axis in FIG. 1) does not overlap with the projection area of the first radiation unit 20 on the second surface 12 along the thickness direction of the antenna 100. The first radiation unit 20 can radiate waves towards the direction where the second surface 12 is located to expand the radiation field type of the antenna 100. In the embodiment of the present disclosure, the height $L_{N2}$ of the dielectric substrate 10 is 1.3 mm.

The first radiation portion 31 is formed by extending one end of the second ground portion 322 away from the first ground portion 321 to the first surface 11. Therefore, the first radiation portion 31 is aligned with the edge on the first surface 11 away from the third radiation portion 22. In the embodiment of the present disclosure, the width of the first radiation portion 31 is the same as the width $W_N$ of the second ground portion 322, both of which are 2.5 mm. The length $L_{N3}$ of the first radiation portion 31 is 12 mm.

Referring to FIG. 1, in some embodiments, the dielectric coefficient of the dielectric substrate 10 is 9.8. Therefore, the dielectric substrate 10 can effectively reduce the field leakage and cross coupling effect of the antenna 100, conducive to better outward radiation by the antenna 100. For example, in the embodiment of the present disclosure, the dielectric substrate 10 is an alumina-ceramic substrate, and the dielectric coefficient of the dielectric substrate 10 is 9.8, and the hardness is 9. Therefore, the dielectric substrate 10 provided in the embodiment of the present disclosure has good drop resistance and corrosion resistance.

The present disclosure does not limit the position of the first surface 11 and the second surface 12 on the dielectric substrate 10, as long as the first surface 11 and the second surface 12 are not on the same surface. Therefore, the area of the dielectric substrate 10 can be reduced to achieve miniaturization of the antenna 100 as much as possible. In the embodiment of the present disclosure, the first surface 11 and the second surface 12 are two surfaces that deviate from each other on the dielectric substrate 10. For example, the first surface 11 and the second surface 12 are the upper surface and the lower surface of the dielectric substrate 10, respectively. Therefore, the required area and volume of the dielectric substrate 10 can be further reduced, allowing a reduction in size of the antenna 100. In other embodiments, the first surface 11 and the second surface 12 may also be two adjacent or spaced surfaces on the dielectric substrate 10.

The present disclosure does not limit the size and shape of the dielectric substrate 10. In other embodiments, the dielectric substrate 10 may also have other shapes. When in different shapes, each part of the first radiation unit 20 and the second radiation unit 30 does not need to be arranged at the edge of the dielectric substrate 10, the first radiation unit 20 and the second radiation unit 30 can still together realize the required functions.

Figure 4:
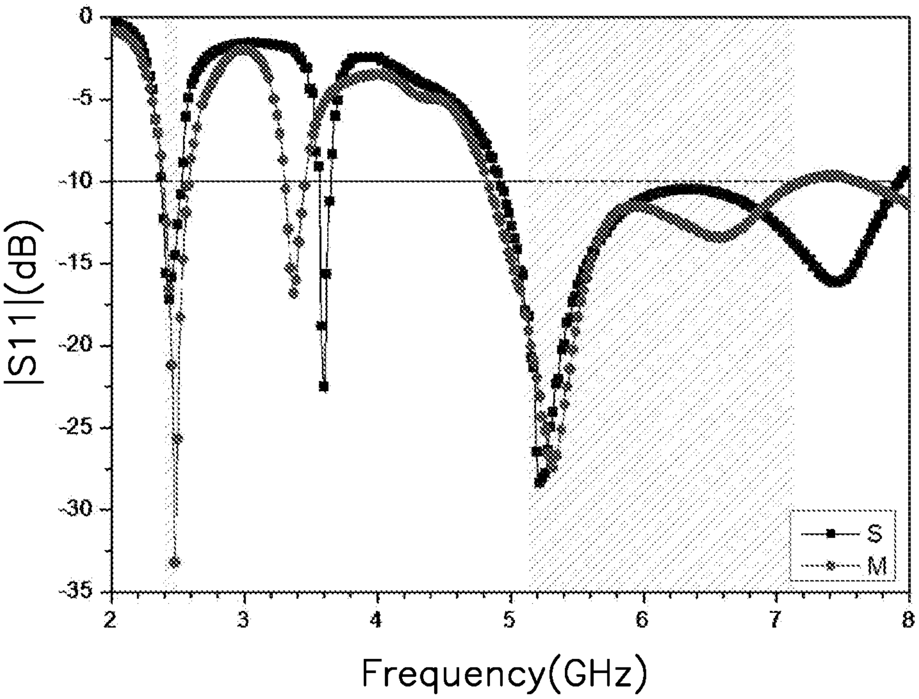
FIG. 4 is a return loss curve diagram of the antenna shown in FIG. 1.

FIG. 4 shows the return loss curve of the antenna 100 provided in the present disclosure. The curve S is the return loss curve of the antenna 100 provided in the disclosure under a simulation; the curve M is the return loss curve of the antenna 100 provided in the present disclosure obtained through physical laboratory test. As shown in FIG. 4, the return loss of the antenna 100 is lower than −10 dB in the first radiation frequency band (including 5.15 GHz to 7.125 GHz) and the second radiation frequency band (including 2.4 GHz to 2.5 GHz), which meets requirements.

The antenna 100 provided in the disclosure can be applied to a variety of Wi-Fi standards such as Wi-Fi 4 (the frequency band covering 2.4 GHz-2.5 GHz), Wi-Fi 5 (the frequency band covering 2.4 GHz-2.5 GHz and 5.15 GHz-5.85 GHz), Wi-Fi 6 (the frequency band covering 2.4 GHz-2.5 GHz and 5 GHz), and Wi-Fi 7 (the frequency band covering 2.4 GHz-2.5 GHz, 5 GHz and 5.925 GHz-7.125 GHz). In theory, Wi-Fi 7 standard can support the bandwidth of up to 30 Gbps for each access point, and the maximum network speed of Wi-Fi 7 can reach 46.4 Gbps. Therefore, the antenna 100 provided in the disclosure meets current requirements relating to development trends of Wi-Fi technology and enables the wireless communication device equipped with the antenna 100 to have a faster network speed while reducing the number of antennas.

The antenna 100 of the present disclosure can extend from the second surface 12 of the dielectric substrate 10 to the first surface 11 through the second radiation unit 30, the first radiation portion 31 and the ground portion 32 are constructed on the second radiation unit 30; the present disclosure also disposes the first radiation unit 20 on the first surface 11 of the dielectric substrate 10, and the first radiation unit 20 receives the current fed by the feed portion 40 to excite the first radiation frequency band. The first radiation portion 31 is coupled to the first radiation unit 20 on the first surface 11 to excite the second radiation frequency band, thus realizing miniaturization broadband performance. The antenna 100 provided in the present disclosure can be applied to various Wi-Fi standards, especially Wi-Fi 7, so that the wireless communication device with the antenna 100 can have a faster network speed while reducing the number of antennas required.

Those of ordinary skill in the art should realize that the above embodiments are only used to illustrate the present disclosure, but not to limit the present disclosure. As long as they are within the essential spirit of the present disclosure, the above embodiments are appropriately made and changes fall within the scope of protection of the present disclosure.

What is claimed is:

1. An antenna comprising:

a dielectric substrate comprising a first surface and a second surface;

a first radiation unit arranged on the first surface;

a second radiation unit extended from the second surface to the first surface; wherein the second radiation unit comprises a ground portion and a first radiation portion, a part of the second radiation unit arranged on the first surface is used as the first radiation portion, and the first radiation portion and the first radiation unit are adjacent and spaced; and a feed portion configured to feed current to the first radiation unit, the first radiation unit excited a first radiation frequency band, the current flowing through the first radiation unit further coupled and fed into the first radiation portion, and the first radiation portion excited a second radiation frequency band;

wherein the first radiation unit comprises a second radiation portion and a third radiation portion, the second radiation portion is connected to the third radiation portion, the second radiation portion is a right-angled trapezoid, and the third radiation portion is rectangular, a length of a bottom edge of the second radiation portion is less than a length of the third radiation portion, a right-angle side edge of the second radiation portion is flush with one end of the third radiation portion.

2. The antenna of claim 1, wherein the first surface deviates from the second surface, the first radiation portion and the second radiation portion are arranged at relative intervals, and the feed portion is connected to the second radiation portion.

3. The antenna of claim 2, wherein the first radiation portion is rectangular, and the first radiation portion is parallel to the third radiation portion.

4. The antenna of claim 2, wherein the ground portion comprises a first ground portion and a second ground portion, and the first ground portion is vertically connected to the second ground portion, the first ground portion is arranged close to the right-angle side edge of the second radiation portion, and the first ground portion is parallel to the right-angle side edge of the second radiation portion; the second ground portion is arranged at one end of the second surface away from the first radiation unit.

5. The antenna of claim 4, wherein the second ground portion is parallel to the third radiation portion, and the second ground portion is connected to the first radiation portion.

6. The antenna of claim 5, wherein the first ground portion and the second ground portion are rectangular.

7. The antenna of claim 1, wherein a dielectric coefficient of the dielectric substrate is 9.8.

8. The antenna of claim 1, wherein the first radiation frequency band comprises 5.15 GHz to 7.125 GHz, and the second radiation frequency band comprises 2.4 GHz to 2.5 GHz.

9. The antenna of claim 1, wherein a projected area of the ground portion on the second surface along a thickness direction of the antenna does not overlap a projected area of the first radiation unit on the second surface along the thickness direction of the antenna.

10. The antenna of claim 1, wherein the dielectric substrate is an alumina ceramic substrate.

11. A wireless communication device comprising:

a plurality of antennas;

each antenna comprising:

- a dielectric substrate comprising a first surface and a second surface;
- a first radiation unit arranged on the first surface;
- a second radiation unit extended from the second surface to the first surface; wherein the second radiation unit comprises a ground portion and a first radiation portion, a part of the second radiation unit arranged on the first surface is used as the first radiation portion, and the first radiation portion and the first radiation unit are adjacent and spaced; and
- a feed portion configured to feed current to the first radiation unit, the first radiation unit excited a first radiation frequency band, the current flowing through the first radiation unit further coupled and fed into the first radiation portion, and the first radiation portion excited a second radiation frequency band;

wherein the first radiation unit comprises a second radiation portion and a third radiation portion, the second radiation portion is connected to the third radiation portion, the second radiation portion is a right-angled trapezoid, and the third radiation portion is rectangular, a length of a bottom edge of the second radiation portion is less than a length of the third radiation portion, a right-angle side edge of the second radiation portion is flush with one end of the third radiation portion.

12. The wireless communication device of claim 11, wherein the first surface deviates from the second surface, the first radiation portion and the second radiation portion are arranged at relative intervals, and the feed portion is connected to the second radiation portion.

13. The wireless communication device of claim 12, wherein the first radiation portion is rectangular, and the first radiation portion is parallel to the third radiation portion.

14. The wireless communication device of claim 12, wherein the ground portion comprises a first ground portion and a second ground portion, and the first ground portion is vertically connected to the second ground portion, the first ground portion is arranged close to the right-angle side edge of the second radiation portion, and the first ground portion is parallel to the right-angle side edge of the second radiation portion; the second ground portion is arranged at one end of the second surface away from the first radiation unit.

15. The wireless communication device of claim 14, wherein the second ground portion is parallel to the third radiation portion, and the second ground portion is connected to the first radiation portion.

16. The wireless communication device of claim 15, wherein the first ground portion and the second ground portion are rectangular.

17. The wireless communication device of claim 11, wherein a dielectric coefficient of the dielectric substrate is 9.8.

18. The wireless communication device of claim 11, wherein the first radiation frequency band comprises 5.15 GHz to 7.125 GHZ, and the second radiation frequency band comprises 2.4 GHz to 2.5 GHz.

19. The wireless communication device of claim 11, wherein a projected area of the ground portion on the second surface along a thickness direction of the antenna does not overlap a projected area of the first radiation unit on the second surface along the thickness direction of the antenna.

20. The wireless communication device of claim 11, wherein the dielectric substrate is an alumina ceramic substrate.

* * * * *